United States Patent Office 3,594,481
Patented July 20, 1971

3,594,481
METHOD FOR THE PROTECTION OF PEOPLE AND ANIMALS FROM BITING AND BLOOD SUCKING INSECTS
Ulf Hendrik Anders Lindberg, Sodertalje, Sweden, and Guy Henry Yeoman, Cuffley, England, assignors to Aktiebolaget Astra, Sodertalje, Sweden
No Drawing. Filed June 7, 1967, Ser. No. 644,080
Claims priority, application Sweden, June 15, 1966, 8,199/66
Int. Cl. A01n 9/22
U.S. Cl. 424—258         5 Claims

ABSTRACT OF THE DISCLOSURE

Insect repellants containing relatively nonvolatile esters of alkyl cinchoninic acids of the formula

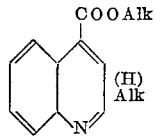

effective over a long time, particularly against ovipositing, biting, or blood sucking pests as blowflies, mosquitoes, biting flies, fleas, chiggers, ticks and mites, and being non-irritating and easy to apply with the hands or a swab or as a spray, relatively insoluble in water and free from odour, and especially such odours as may be regarded as unpleasant or disagreeable, and difficult to mask. Preferably, also, the repellant has little or no solvent action on various finishes, paints, varnishes, lacquers, plastics, synthetic fibres, and the like.

---

This invention relates to methods and compositions for the protection of people and animals from ovipositing, biting, and blood sucking insects. More particularly, it relates to methods and compositions for repelling insects and discouraging biting or oviposition by these pests.

A great number of insect repellants are known. As early as in 1901 the effectiveness of oil of citronella as a repellant was recorded. Since that time many other essential oils, mixtures of various kinds of oils, greases, ointments, and powders have been tried with varying degrees of success. Among insect repellants at present available and which are widely used are N,N-diethyltoluamide, 2,3,4,5-bis($\Delta_2$-butylene)-tetrahydrofurfural, di-n-propyl isocinchomeronate, butoxypolypropylene glycol and di-n-butyl succinate.

A substance to be generally acceptable as a repellant should possess durability or effectiveness over a relatively long period of time against one or more of such ovipositing, biting, or blood sucking pests as blowflies, mosquitoes, biting flies, fleas, chiggers, ticks, mites, and the like. To this end it should be relatively stable chimically, and not readily dissipated by evaporation or vaporization. For dermal application a repellant should be non-irritating and easy to apply with the hands or a swab or as a spray. For use under wet-skin conditions, that is, skin which may be moist or wet with perspiration, the repellant preferably should be relatively insoluble in water.

Repellants which may affect clothing by staining, bleaching, or weakening of the fiber, or which leave an objectionable "oily" appearance or feel on the skin are limited in their usefulness. Preferably, the repellant should be free from odour, especially such odours as may be regarded as unpleasant or disagreeable, and difficult to mask. Preferably, also, the repellant substance should have little or no solvent action on various finishes, paints, varnishes, lacquers, plastics, synthetic fibres, and the like.

It has now been found that the desirable qualities or characteristics enumerated above, as well as excellent repellant activity, are combined to an exceptionally high degree in relatively non-volatile esters of alkyl cinchoninic acids, Especially active are compounds of the formula

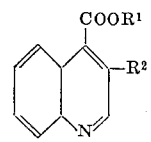

wherein $R^1$ is an alkyl group of 1–6, preferably 2–4 carbon atoms and $R^2$ represents a hydrogen atom or an alkyl group of 1–4 carbon atoms.

The method according to the present invention for the protection of people and animals from ovipositing, biting, and blood sucking insects is characterized by applying to the skin and/or clothing one or more compounds of the Formula I alone or together with one or more other insect repellant compounds, possibly in admixture with a carrier.

One or more active compounds of the Formula I alone or together with other repellant compounds may be mixed, emulsified with or dissolved in a carrier and applied in this form or without any carrier being present. The carrier may be in a liquid, semi-liquid, or solid form; preferably liquid or semi-liquid carriers are used. Among these carriers are liquid, organic diluents, for example organic solvents such as alcohols, hydrocarbons, halogenated hydrocarbons, ketones, and the like; e.g. ethyl-, isopropylalcohol, glycerol, cyclohexanol, methylcyclohexanol, trichloroethylene, benzene, also esters of vegetable or animal origin, such as vegetable or animal oils and fats such as peanut oil, cocoa butter, lanolin, and others; alternatively mineral oils and fats such as paraffin oil, white mineral oil, vaseline and the like may also be used. If an aqueous emulsion of the repellant is wanted, the water together with an emulsifying agent, possibly with addition of one or more of the compounds mentioned above, takes over the part as carrier. As solid carriers compounds of organic as well as inorganic origin may be contemplated. Among the members of the first mentioned group are beeswax, paraffin, cetyl alcohol and of the last mentioned group, kaolin and talc. Of course, further additions to such a composition may be done with regard to any secondary purpose for which the composition may be used, e.g. as a sun screen agent. By choosing one or more carriers as well as further additions in a suitable way aerosol sprays, solutions, dressings, creams, oils, emulsions of powders, sticks, lotions, impregnated towels may be obtained.

The compounds of the Formula I may be prepared by esterifying cinchoninic acid with an alcohol of the formula $R^1$—OH in the presence of a mineral acid in cases when $R^2$ is a hydrogen atom and by esterifying the substituted cinchoninic acid chloride with an alcohol of the formula $R^1$—OH in cases when $R^2$ represents an alkyl group of 1–4 carbon atoms.

These repellant esters are for the most part liquids at ordinary temperatures which have but a limited miscibility with water and which may be placed directly in contact with the skin without substantial irritant effect. The odour, if any, is mild and may be readily masked. The solvent action on materials or articles with which the esters are likely to come in contact during ordinary use is slight, and fabrics, paints, varnishes, lacquers, plastics, and the like are not appreciably attacked by them, if at all.

The toxicity of the compounds of the present invention is low. For instance, $LD_{50}$ p.o. of 3-ethyl cinchonicic acid ethyl ester was found to be 3.4 g./kg. bodyweight compared with $LD_{50}$ p.o. of N,N-diethyltoluamide which was found to be 1.8 g./kg. bodyweight.

These repellant esters have so far been shown to give relatively lasting protection against the following test insects: the biting stable fly, *Stomoxys calcitrans*; the sheep blowfly, *Lucilia sericata*; the Australian sheep blowfly, *Lucilia cuprina*; the housefly, *Musca domestica*; the freshwater mosquitoes, *Aedes aegypti* and *Culex fatigans*; and the biting midge, *Culicoides obsoletus* and the tsetse flies, *Glossina pallipides* and *Glossina palpalis*. The effect of these repellant esters is illustrated by the following examples.

EXAMPLE 1

Quarter inch wide molasses strips were baked on to small cards. Known amounts of the test material in 0.1 ml. of acetone were dispersed on 3 x ½ inch tissues which were then stapled over the molasses strips. Each complete card was weighed and then fixed in a culture dish in a bent position which ensured a very close contact of tissue to molasses. 10 flies (*Lucilia sericata*) of each sex, 4 days old, starved for 19 hours (water only), were enclosed in the dish. Numbers of flies feeding at intervals of 60 minutes during 5 hours were recorded. At the end of the 5 hours the cards were re-weighed. The result was judged on the bases of total number of flies feeding and quantity of molasses taken, as judged by change of weight of the card.

In Table I the percent repellancy of compounds of the Formula I, wherein $R^1$ and $R^2$ have the specified significance, is given together with a characterization of the compounds by their boiling points (excepting 3-methyl cinchoninic acid methyl esters the melting point of which is 74.5–76.0° C.). As a comparison the repellancy of diethyltoluamide is given.

TABLE I

| $R^1$ | $R^2$ | Boiling point, ° C./mm. Hg | Percent repellance at (mg./cm.²)— | | | | | |
|---|---|---|---|---|---|---|---|---|
| | | | (0.05) | (0.1) | (0.4) | (1.35) | (2.7) | (5.0) |
| $C_2H_5$ | H | 170/10 | 0 | 63 | | | | 96 |
| $CH_3$ | $CH_3$ | | | 61 | 11 | 41 | 64 | 56 |
| $C_2H_5$ | $CH_3$ | 143/1.0 | 100 | 94 | 100 | 98 | 100 | 100 |
| $C_3H_7$ | $CH_3$ | 148/0.8 | 73 | 98 | 100 | 99 | 99 | 100 |
| $C_4H_9$ | $CH_3$ | 161/0.9 | | 68 | 100 | 90 | 100 | 96 |
| $C_5H_{11}$ | $CH_3$ | 130/0.6 | | 40 | 78 | 74 | 93 | 89 |
| $C_6H_{13}$ | $CH_3$ | 189/2.0 | | 15 | 39 | 65 | 77 | 47 |
| $CH_3$ | $C_2H_5$ | 135/0.3 | | 87 | 98 | 94 | 99 | 68 |
| $C_2H_5$ | $C_2H_5$ | 132/0.8 | 98 | 90 | 99 | 100 | 100 | 100 |
| $C_3H_7$ | $C_2H_5$ | 150/0.6 | | 52 | 96 | 95 | 99 | 100 |
| $C_4H_9$ | $C_2H_5$ | 158/0.1 | | 11 | 91 | 78 | 90 | 91 |
| $C_5H_{11}$ | $C_2H_5$ | 167/0.3 | | 10 | 32 | 64 | 89 | 52 |
| $C_6H_{13}$ | $C_2H_5$ | 180/0.6 | | 0 | 57 | 55 | 70 | 63 |
| $CH_3$ | $C_3H_7$ | 133/0.3 | | 73 | 98 | 94 | 99 | 100 |
| $C_2H_5$ | $C_3H_7$ | 126/0.2 | | 73 | 100 | 77 | 98 | 88 |
| $C_3H_7$ | $C_3H_7$ | 145/0.3 | | 73 | 94 | 86 | 95 | 98 |
| $C_4H_9$ | $C_3H_7$ | 154/0.2 | | 9 | 76 | 71 | 90 | 77 |
| $C_5H_{11}$ | $C_3H_7$ | 172/0.4 | | 14 | 55 | 35 | 74 | 0 |
| Diethyltoluamide | | | 20 | 53 | 83 | 84 | 96 | 92 |

EXAMPLE 2

Measured amounts of the test substances dissolved in 0.06 mg. of ethanol were applied to the shaved abdomen of white mice to give an application rate of 0.0008 ml./cm.², which rate was found to give activity conveniently above that for controls but below the 100% repellancy level. After 5 hours the treated area was exposed to a strong challenge of about 30 standard cultured *Stomoxys calcitrans* which had been deprived of food and water for the previous 24 hours. A general anaesthetic was used and the mice were exposed for 1 hour (i.e. from 5th–6th hour after application). After this the flies were killed with chloroform and squashed on to filter paper between glass plates to indicate those which had taken a blood meal. From this the percentage fed was worked out and thence, by comparison with the controls (which were rated 0% repellant) a "percentage repellancy" was deduced. Replicates were carried out in each case, exposure for these being from about 6th to 7th hour after application. Results were combined and averaged. In Table II the percent repellancy of compounds of the Formula I, wherein $R^1$ and $R^2$ have the specified significance is given together with the repellancy of diethyltoluamide tested by the same method. In the last column the overall average of all tests of each compound is given.

TABLE II

| $R^1$ | $R^2$ | Percent repellancy in Test No. — | | | | | | | | Average |
|---|---|---|---|---|---|---|---|---|---|---|
| | | 1 | 2 | 3 | 4 | 5 | 6 | 7 | 8 | |
| $C_2H_5$ | $CH_3$ | | 6 | 25 | 79 | 50 | | | | 40 |
| $C_3H_7$ | $CH_3$ | | 54 | 23 | 100 | 95 | 15 | 50 | 24 | 52 |
| $C_4H_9$ | $CH_3$ | 48 | | 68 | | | 47 | | 73 | 59 |
| $C_2H_5$ | $C_2H_5$ | 79 | 54 | 53 | 100 | 100 | 55 | 34 | 59 | 67 |
| $C_2H_5$ | $C_3H_7$ | 89 | | 45 | | | | | 61 | 65 |
| Diethyltoluamide | | 48 | 5 | 30 | 40 | 47 | 57 | 16 | | 35 |

EXAMPLE 3

Measured amounts of the test substances dissolved in ethanol were applied to the shaved abdomen of white mice and to a 1 cm. wide surrounding screens in such a manner that flies wishing to feed on the mouse could not avoid touching a treated surface.

(a) For test of initial potency the mice were exposed to a strong challenge of about 30 standard cultured *Stomoxys calcitrans* which had been deprived of food and water for the previous 24 hours. A general anaesthetic was used and the mice were exposed for 30 minutes. After this the flies were killed with chloroform and squashed on to filter paper between glass plates to indicate those which had taken a blood meal. From this the percentage fed was worked out and thence, by comparison with the controls (which were rated 0% repellant) a "percentage repellancy" was deduced. Replicates were carried out in each case.

Combined results are shown in Table IIIa.

TABLE IIIa

| | Percent repellancy at an application rate of— | | | | | | | |
|---|---|---|---|---|---|---|---|---|
| Ml./cm.² | $10^{-3}$ | $3\times10^{-4}$ | $10^{-4}$ | $3\times10^{-5}$ | $10^{-5}$ | $3\times10^{-6}$ | $10^{-6}$ | $10^{-7}$ |
| ≅Mg./cm.² | 1.0 | 0.3 | 0.1 | 0.03 | 0.01 | 0.003 | 0.001 | 0.0001 |
| Compound: | | | | | | | | |
| 3-ethyl cinchoninic acid ethyl ester | 100 | 100 | 100 | 83 | 48 | 37 | 38 | 33 |
| 3-methyl chinconinic acid butyl ester | 100 | 100 | 100 | 100 | 88 | 82 | 67 | 57 |
| Cinchoninic acid butyl ester [1] | 100 | 100 | 100 | 89 | 82 | 34 | 18 | 26 |
| N,N-diethyltoluamide | 100 | 100 | 98 | 69 | 40 | 37 | 58 | 46 |
| 2,3,4,5-bis ($\Delta_2$-butylene-tetrahydrofurfural) | — | — | — | 93 | 59 | 31 | 33 | 30 |
| Di-n-propyl isocinchomeronate | — | — | — | 67 | 48 | 25 | 24 | 31 |
| Butoxypolypropylene glycol | — | — | — | — | 34 | — | 53 | 24 |
| Di-n-butyl succinate | — | — | — | — | — | — | 24 | 16 |

[1] Boiling point 200° C. at 10 mm. Hg.
— = not tested.

(b) In order to test the persistancy a similar test to the above was carried out but a five hour time lapse was allowed between application to the mice and screens and challenge by the test insects. The results are shown in Table IIIb.

TABLE IIIb

| Compound | Percent repellancy at an application rate (ml./cm.²) of— | |
|---|---|---|
| | (10⁻⁴) | (10⁻⁵) |
| 3-ethyl cinchoninic acid ethyl ester | 82 | 0 |
| 3-methyl cinchoninic acid butyl ester | 97 | 66 |
| Cinchoninic acid butyl ester | 70 | 51 |
| 2,3,4,5-bis (Δ₂-butylene-tetrahydrofurfural | 79 | 20 |
| Di-n-propyl isocinchomeronate | 54 | 0 |

EXAMPLE 4

By the method described in Example 2 but using an application rate of 0.0016 ml./cm.² compounds according to the invention were tested against heavy challenge of about 50 standard cultured *Aedes aegypti*. Since only the female bites the squashed mosquitoes were sexed in order to work out the "percent fed." In Table IX the percent repellancy of compounds of the Formula I, wherein $R^1$ and $R^2$ have the specified significance is given.

TABLE IV

| R¹ | R² | Percent repellancy in Test No.— | | | | | |
|---|---|---|---|---|---|---|---|
| | | 1 | 2 | 3 | 4 | 5 | Average |
| C₃H₇ | CH₃ | | 28 | 50 | 96 | 60 | 59 |
| C₄H₉ | CH₃ | 26 | | | | | |
| C₂H₅ | C₂H₅ | | 81 | 53 | | 58 | 66 |
| C₃H₇ | C₂H₅ | 80 | 44 | 36 | | | 53 |
| CH₃ | C₃H₇ | 25 | | | | | |
| C₃H₇ | C₃H₇ | 30 | | | | | |

Insect repellant compositions comprising as active ingredients compounds according to the invention are illustrated by the following examples

EXAMPLE 5

30 g. 3-methyl cinchoninic acid propyl ester and 70 g. of diatomaceous earth were mixed and homogenized. An insect repellent powder was thus obtained.

EXAMPLE 6

16 g. of white wax, 10 g. of vaseline and 12 g. of paraffin oil were heated together at 70° C. until all substance was melted. Then 30 g. of 3-ethyl cinchoninic acid ethyl ester was added.

0.8 g. of sodium borate was dissolved in 31 g. of water heated to 70° C., whereafter this solution and 0.5 g. of perfume was added to the melted substances while vigorous stirring. The stirring was continued until the cream had cooled off.

EXAMPLE 7

20 g. of 3-ethyl cinchoninic acid propylester was dissolved in a mixture of 15 g. of polyoxyethylene sorbitan monolaurate and 40 g. of ethanol. 0.5 g. of perfume and water to 100 g. was added while stirring. An insect repellent lotion which also may be used in a hand operated sprayer was thus obtained.

EXAMPLE 8

A concentrate was prepared by mixing 50 g. of 3-ethyl cinchoninic acid ethyl ester, 45 g. of ethanol, 4.5 g. of propylene glycol and 0.5 g. of perfume.

An aerosol spray was then prepared by using 75% of concentrate and 25% of dichlorodifluoromethane.

What is claimed is:

1. A method for the protection of people and animals from ovipositing, biting, and blood-sucking insects, comprising applying to the skin or clothing a a sufficient amount of a compound of the formula:

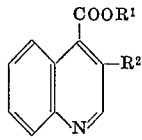

I to repel said insects wherein $R^1$ is alkyl having 1–6 carbon atoms and $R^2$ is selected from the group consisting of hydrogen and alkyl having 1–4 carbon atoms, and wherein said compound is utilized alone or in admixture with a carrier.

2. A method according to claim 1, wherein $R^1$ is alkyl having 2–4 carbon atoms.

3. A method according to claim 1, wherein $R^1$ is butyl and $R^2$ is methyl.

4. A method according to claim 1, wherein $R^1$ and $R^2$ are ethyl.

5. A method according to claim 1, wherein $R^1$ is butyl and $R^2$ is hydrogen.

References Cited

UNITED STATES PATENTS 2,605,208   7/1952   Bartlett et al. _____ 424—258

OTHER REFERENCES

Chemical Abstracts 44:7717C (1950).

JEROME D. GOLDBERG, Primary Examiner

PO-1050
(5/69)

UNITED STATES PATENT OFFICE
CERTIFICATE OF CORRECTION

Patent No. 3,594,481　　　　　　　　Dated July 20, 1971

Inventor(s) Ulf Henrik Anders Lindberg, et al

It is certified that error appears in the above-identified patent and that said Letters Patent are hereby corrected as shown below:

Col. 2, line 51, "emulsions of powders" should be -- emulsions or powders --;

Col. 3, line 49, Table 1-Col. 1.35, "71" should be -- 61 --;

Col. 3, line 69, Table IIIa, "chinconinic" should be -- cinchoninic --.

Signed and sealed this 28th day of March 1972.

(SEAL)
Attest:

EDWARD M. FLETCHER, JR.　　　　　ROBERT GOTTSCHALK
Attesting Officer　　　　　　　　　Commissioner of Patents